US011157652B2

(12) United States Patent
Basava et al.

(10) Patent No.: US 11,157,652 B2
(45) Date of Patent: Oct. 26, 2021

(54) OBFUSCATION AND DELETION OF PERSONAL DATA IN A LOOSELY-COUPLED DISTRIBUTED SYSTEM

(71) Applicant: MICROSOFT TECHNOLOGY LICENSING, LLC., Redmond, WA (US)

(72) Inventors: Shibani Basava, Seattle, WA (US); Dinesh Chandnani, Sammamish, WA (US); Zhu Chen, Redmond, WA (US); Ram Kumar Donthula, Redmond, WA (US); Matthew Sloan Theodore Evans, Kindred, ND (US); Siwei Li, Bothell, WA (US); George Joshua Michaels, Seattle, WA (US); Andrew Christopher Neil, Seattle, WA (US); Geoffrey Staneff, Woodinville, WA (US); Evgenia Steshenko, Seattle, WA (US); Vijay Upadya, Sammamish, WA (US); Shengyu Fu, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 324 days.

(21) Appl. No.: 16/215,549

(22) Filed: Dec. 10, 2018

(65) Prior Publication Data

US 2019/0354716 A1 Nov. 21, 2019

Related U.S. Application Data

(60) Provisional application No. 62/672,073, filed on May 16, 2018.

(51) Int. Cl.
*G06F 21/00* (2013.01)
*G06F 21/62* (2013.01)
(Continued)

(52) U.S. Cl.
CPC ........ *G06F 21/6254* (2013.01); *G06F 16/215* (2019.01); *G06F 16/2379* (2019.01); *H04L 9/0643* (2013.01); *H04L 2209/16* (2013.01)

(58) Field of Classification Search
CPC ............. G06F 21/6254; G06F 16/2379; G06F 16/215; H04L 9/0643; H04L 2209/16
See application file for complete search history.

(56) References Cited

U.S. PATENT DOCUMENTS 9,202,078 B2 12/2015 Abuelsaad et al.
9,767,488 B1 * 9/2017 Wang ................. G06Q 30/0275
(Continued)

FOREIGN PATENT DOCUMENTS

EP 3040898 A1 7/2016
WO 2014075836 A1 5/2014

OTHER PUBLICATIONS

"International Search Report and Written Opinion Issued in PCT Application No. PCT/US2019/031401", dated Aug. 20, 2019, 11 Pages.

*Primary Examiner* — Joseph P Hirl
*Assistant Examiner* — Chi D Nguy

(57) ABSTRACT

A real-time event processing system receives event data containing telemetric data and one or more personal identifiers. The personal identifier in the event data is replaced with an obfuscated value so that the telemetric data may be used without reference to the personal identifier. A reversible map is used to reverse the obfuscated personal identifier to its original value. In the case when a request is received to delete the mapped personal identifier, the link to the entry in the reversible map is broken by associating the personal identifier with a different obfuscated value.

19 Claims, 8 Drawing Sheets

(51) Int. Cl.
*G06F 16/215* (2019.01)
*H04L 9/06* (2006.01)
*G06F 16/23* (2019.01)

(56) References Cited

U.S. PATENT DOCUMENTS 9,910,902 B1* 3/2018 Kramer ............... G06F 16/2272
2019/0020468 A1* 1/2019 Rosenoer ............ H04L 63/0414
2019/0303610 A1* 10/2019 Bodegas Martinez ......................
G06F 16/2456

* cited by examiner

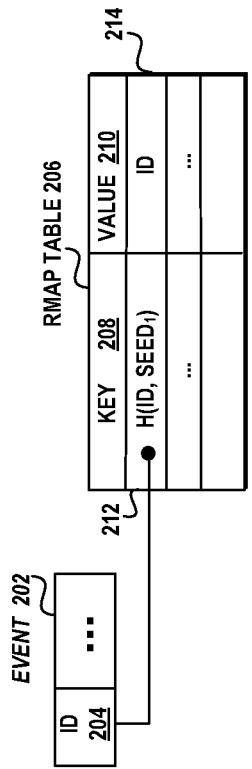
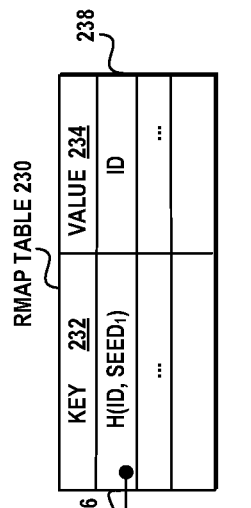
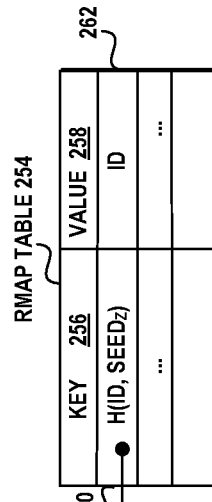
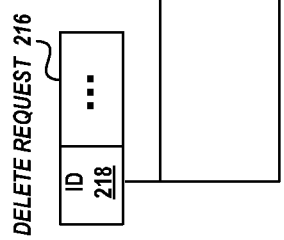
FIG. 2A
BEFORE DELETE REQUEST
FIG. 2B
AFTER THE FIRST DELETE REQUEST FOR ID
FIG. 2C
ANOTHER EVENT RECEIVED AFTER THE FIRST DELETE REQUEST FOR THE SAME ID

AFTER A SECOND DELETE REQUEST THAT IS ASSOCIATED WITH THE SAME ID

NEW EVENT ARRIVES AFTER THE SECOND DELETE REQUEST THAT IS ASSOCIATED WITH THE SAME ID

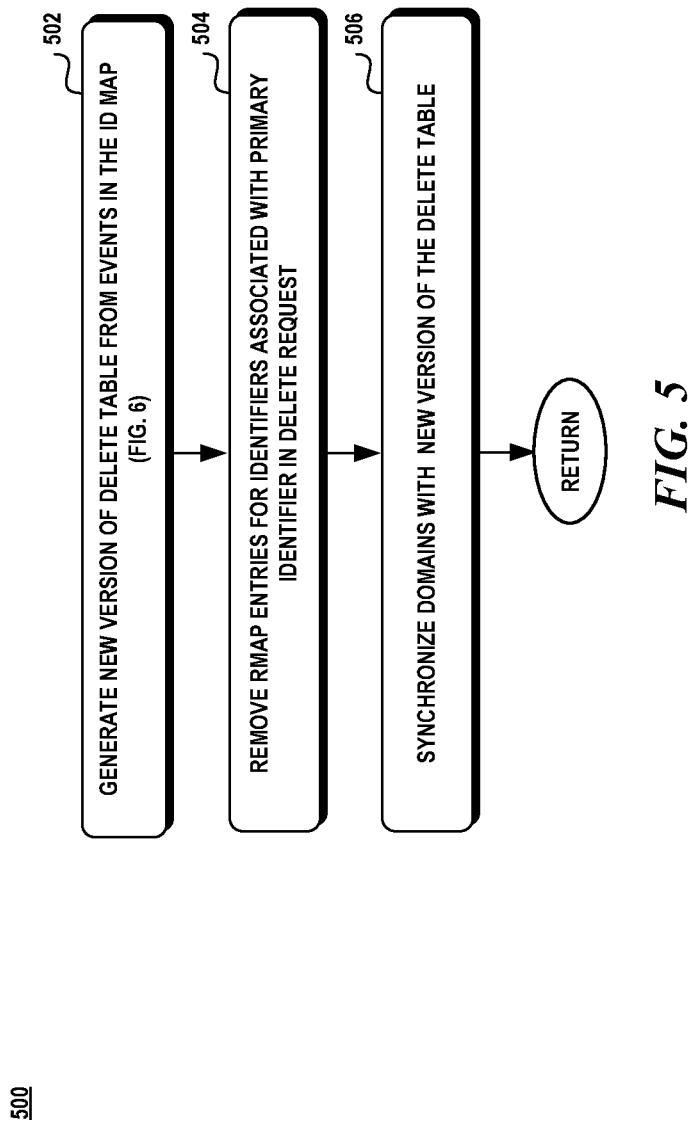

OBFUSCATION AND DELETION OF PERSONAL DATA IN A LOOSELY-COUPLED DISTRIBUTED SYSTEM

CROSS-REFERENCE TO RELATED APPLICATION

This application claims the benefit of U.S. Provisional Application No. 62/672,073 filed on May 16, 2018.

BACKGROUND

Telemetric data generated during the use of a software product, website, or service ("resource") is often collected and stored in order to study the performance of the resource and/or the users' behavior with the resource. The telemetric data provides insight into the usage and performance of the resource under varying conditions some of which may not have been tested or considered in its design. The telemetric data is useful to identify causes of failures, delays, or performance problems and to identify ways to improve the customers' engagement with the resource.

In order to facilitate the real-time data processing of a large volume of telemetric data, the telemetric data may be stored in different storage locations in various devices. The telemetric data may include the personal information of the user of the resource. The personal information may include a personal identifier that uniquely identifies a user such as, a name, phone number, email address, social security number, login name, account name, machine identifier, and the like.

However, the removal of the personal information found in the telemetric data may be complicated by the manner in which the telemetric data is stored. The data may be stored such that there may not be any way to track down all the storage locations containing all the telemetric data having personal identifiers without searching all possible storage locations. This may not be possible or practical when a large volume of telemetric data is collected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A real-time event processing system replaces personal identifiers contained with telemetric data with obfuscated values so that the telemetric data may be analyzed without reference to the personal identifiers. A reversible map is used to map the obfuscated personal identifier to the original personal identifier when the identity of the user is needed. The personal identifiers in the reversible map are removed upon request from the associated user by delinking the key that accesses the corresponding entry in the reversible map.

In one aspect, a cryptographic hash function is used to obfuscate the personal identifier into an obfuscated value. The cryptographic hash function uses different seeds in order to distinguish an obfuscated value that represent a personal identifier not subject to a delete request from an obfuscated value that represents a personal identifier subject to a delete request. A delete request is implemented by associating a different obfuscated value to the personal identifier in the delete table thereby eliminating access to its corresponding entry in the reversible map. In this manner, the personal identifier is deleted from the reversible map in a constant time operation that is relatively inexpensive.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 2A-2E illustrate the state of a reversible map ("RMAP") table and a delete table at various points in the event processing.

FIG. 5 is a flow diagram illustrating an exemplary method for processing the delete requests.

DETAILED DESCRIPTION

Overview

Figure 1:
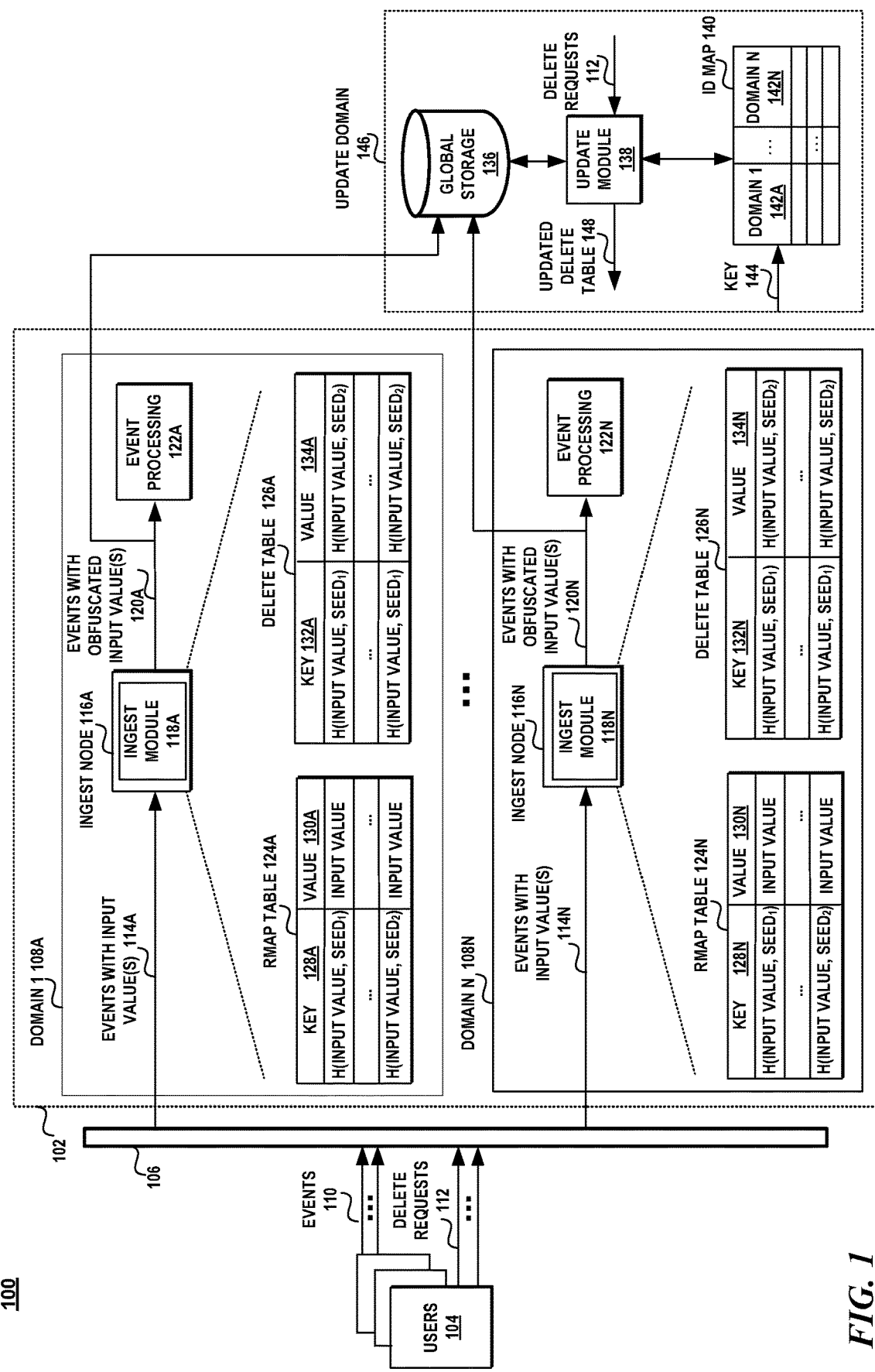
FIG. 1 illustrates an exemplary real-time system for the obfuscation and removal of personal information from telemetric data.

The subject matter disclosed pertains to a real-time event processing system that receives events containing telemetric data and one or more personal identifiers. The real-time event processing system obfuscates the personal identifiers contained with the telemetric data so that the telemetric data may be analyzed without reference to a personal identifier. A reversible map is used to map the obfuscated personal identifier to the original personal identifier when the identity of the user is needed.

The user of the personal identifier may request that their personal identifiers be deleted from the real-time event processing system. In this case, the link to the personal identifier in the reversible map is broken and the obfuscated personal identifier is retained in order to track that the user had previously issued a delete request. When telemetric data is received from a user having issued a previous delete request, the personal identifiers in the new event are obfuscated with a different obfuscated value so that the identity of the user cannot be derived from the previous obfuscated value.

The personal identifiers are obfuscated using a cryptographic hash function that maps a personal identifier into a hash value. The cryptographic hash function uses different seeds or salts in order to distinguish between a hash value that represents a deleted personal identifier from a hash value that represents an obfuscated personal identifier that is not associated with a delete request. In one aspect, the cryptographic hash function generates a 32-byte hash value to represent an obfuscated personal identifier not associated with a delete request and a 33-byte hash value to represent an obfuscated personal identifier associated with a delete request.

In order for the real-time event processing system to process a large amount of data, the system is configured as a loosely-coupled distributed system having multiple independent domains with each domain configured to process events for a particular resource. The use of a loosely-coupled distributed system is beneficial for processing large volumes of data quickly. However, to maintain the high throughput achieved by a loosely-coupled distributed system, the obfuscation and removal of the personal identifiers needs to be performed in a cost-effective manner. This processing is complicated by the fact that a single user may be associated with multiple resources with different personal identifiers appearing in different domains. To overcome this complexity, the deletion of all the personal identifiers associated with a user is facilitated by an identifier map and a common delete table. The identifier map is used to track the additional personal identifiers and the domains in which they are located in order to completely remove access to a user's personal data in the system. A common delete table is used by each domain to track the deleted obfuscated personal identifiers which may reside in any domain. The common delete table is updated periodically by an offline process which synchronizes the new updated delete table in each domain simultaneously.

Attention now turns to a description of a system for obfuscating and removing personal information in telemetric data processed by a loosely-coupled distributed system.

System

FIG. 1 illustrates an exemplary system for the real-time processing of telemetric data. In one aspect, the system 100 includes a loosely-coupled distributed system 102 that processes events 110 from one or more users 104 through a network 106. The loosely-coupled distributed system 102 consists of a number of domains 108A-108N ("108") that operate independent of each other without centralized control. A domain 108 may be configured with one or more computing devices. In one aspect, a domain 108 may be configured to process events that are associated with a particular resource. For example, a domain may be configured to process events originating from the usage of a particular software product.

The users 104 are engaged with a resource through the use of a computing device. The resource uses an agent that is either coupled to the resource (i.e., add-on, extension, plug-in, operating system) or embedded within the resource. The agent generates events 110 during the operation of the resource or during the user's interaction with the resource. The agent generates an event 110 upon the occurrence of a user action, in response to a user action, or to measure an attribute of the user's behavior at certain time intervals. An event 110 contains telemetric data that may include performance metrics, timing data, memory dumps, stack traces, exception information, and/or measurements in addition to personal information. There may be multiple events 110 that are created during a user's engagement with a resource and the events 110 may be generated for multiple and different resources that the user engages with.

For example, an event 110 may be generated from actions that are performed by an operating system based on a user's interaction with the operating system or resulting from a user's interaction with an application executing under the operating system. Events 110 may be system-generated logs generated by a resource, such as a software product, to fix problems and improve the quality of the product. In this case, the events 110 may include data from crashes, hangs, user interface unresponsiveness, high CPU usage, high memory usage, and the like. The data may include memory dumps, stack traces, and exception information.

The event 110 may include personal information. The personal information may include one or more personal identifiers that uniquely represent a user and may include a name, phone number, email address, social security number, login name, and the like. An agent on the user's computing device transmits an event to a particular domain 108.

Each domain 108 may include an ingest node 116A-116N ("116"), a reversible map ("RMAP) table 124A-124N ("124") and a delete table 126A-126N ("126"). An ingest node 106 is associated with a dedicated endpoint that is registered with a computing device of a user 104. The endpoint is a port or uniform resource locator (URL) that the computing device 102 uses to connect to a particular domain. The ingest node 116 may be implemented as a computing device or a component within a computing device.

Each ingest node 116 receives events 110 which may include personal information or input values that need to be obfuscated 114A-114N ("114"). An ingest node 116 includes an ingest module 118A-118N ("118") that searches for the personal identifiers in the event. The personal identifier in the event 110 is then obfuscated so that the remaining information in the event may be used for further event processing 122A-122N ("122"). The obfuscation of the personal identifier is tracked in order to prevent access to the storage locations associated with the obfuscated personal identifier when a delete request is received.

Each ingest node 116 may include a reversible-map, "RMAP", table 124A-124N ("124") and a delete table 126A-126N ("126"). The RMAP table 124 provides a reversible mapping of the obfuscated representation of a personal identifier to the original personal identifier. In some situations, the user may need to be contacted in order to discuss an issue raised by the telemetric data. The identity of the user can be obtained by reverse mapping the obfuscated value back to the original value and then using the original value to discover the identity of the user.

The delete table 126 contains a list of the deleted obfuscated personal identifiers for the entire system. An entry in the delete table 126 indicates that the personal identifier has been previously deleted from the system. The delete table 126 is accessed by a first obfuscated representation of a personal identifier which maps to a second obfuscated representation of the personal identifier which is stored in the delete table 126. Each domain uses the same delete table 126.

In one aspect, a personal identifier is obfuscated using a hash function that transforms the personal identifier into a hashed value. The hash function may be any common hashing function or cryptographic hash function, such as the Message Digest5 (MD5) algorithm, the Secure Hash Algorithm (SHA), and the like. In one aspect, the SHA-256 function is used, with the original value of a personal identifier and a seed as its parameters. The seed or salt is random data (i.e., randomized value) that is used in a hash function to protect the stored hash value.

The hash function transforms the personal identifier into a first-generation hash value, H(input value, $seed_1$), that represents the personal identifier. A first seed, $seed_1$, is used in the computation of the first-generation hash and a second seed, $seed_2$, is used in the computation of the second-generation hash.

The output of a hash function is a fixed-length hash value. In order to differentiate between a personal identifier that has been deleted from the system and a personal identifier that remains in the system as an obfuscated value, two different seeds are used. A first-generation hash value uses a first seed, seed$_1$, to generate a hash value of 32 bytes which represents an obfuscated personal identifier that has not been deleted from the system. A subsequent hash value obtained using the hash function with a subsequent seed, seed$_2$, generates a hash value of 33 bytes to represent a personal identifier that has been deleted from the system. Two different seed values are used in order to preserve the identity of the first-generation hash value.

As shown in FIG. 1, the RMAP table 124 contains a key 128A-128N ("128") that is the first-generation hash value and the original input value 130A-130N ("130"). The delete table 126 contains a key 132A-132N ("132") and a value 134A-134N ("134"). The key 132 is the first-generation hash value and the value 134 is the second or subsequent-generation hash value. A subsequent-generation hash value uses a different seed than the first-generation hash value.

The event processing system 102 also receives delete requests 112 from users 104 to delete their personal identifiers. In some cases, a user may have several personal identifiers. For example, a user may have an account name for a cloud service, a login name for a software product, and an email address for a mail service. Each personal identifier may have been obfuscated in a different domain and associated with a different obfuscated value. In this scenario, the different domains may not be aware of the various personal identifiers associated with a user. In order to ensure that all of the personal identifiers belonging to a user are deleted from the event processing system, the delete requests 112 are collected and processed offline, separate from the ingestion processing, in an update domain, in order to synchronize the delete table used in each domain.

In one aspect, the delete request processing is performed offline outside of the domains 108 and in an update domain 146. The delete request processing utilizes a global storage 136, an update module 138, and an ID Map 140 to generate an updated delete table 148. The global storage 136 is accessible by each of the domains 108 and can be implemented as a database, cloud storage, and the like.

Once the events have been updated with obfuscated input values 120A-120N ("120"), the events are stored in global storage 136. An update module 138 generates an ID Map 140 from the events stored in the global storage 136. The ID Map 140 contains the hash values of each personal identifier in each domain 142 based on a key 144 common to the personal identifier in each domain 142. The update module 138 creates an updated version of the delete table 148 which is used in each domain.

Attention now turns to FIGS. 2A-2C which illustrate the use of the RMAP and delete tables in further detail.

Figure 2D:
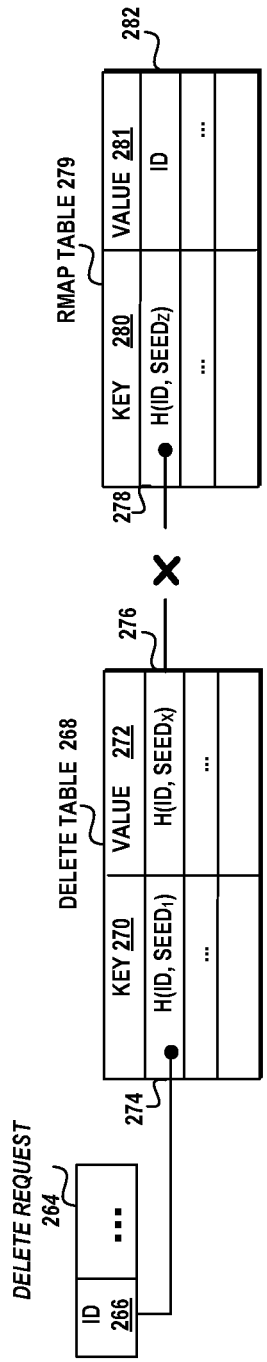

FIGS. 2A-2E illustrate the various states of the RMAP table and the delete table. FIG. 2A shows the state of the RMAP table 206 after a personal identifier has been obfuscated in an event before a delete request is received by the user associated with the personal identifier. As shown in FIG. 2A, an event 202 is received having identifier, ID 204. The RMAP table 206 contains an obfuscated value 212 as the key 208 and the original identifier 214 as the value 210. The hashed value 212 is generated using the identifier 204 and a first-generation seed, seeds. There is no entry in the delete table since a delete request has not been received for this personal identifier.

FIG. 2B shows the state of the delete table 220 and the RMAP table 230 after a delete request has been processed and the delete table 220 updated. A second hash value 228 is used to represent the personal identifier which is stored in the delete table 220 along with its first-generation hash value 226. The RMAP table 230 contains a key 232 and value 234 pair of data for each entry. Access to the entry in the RMAP table 230 is removed by associating the personal identifier with a second hash value 228 that is generated using a different seed or salt, seed$_z$. As such, there is no longer any access to the entry in the RMAP table 230 for the personal identifier 238 based on the first-generation hash value 236.

As shown in FIG. 2B, the delete request 216 includes an identifier, ID 218. The delete table 220 contains a key 222 and a value 224 for each entry. The hashed value corresponding to the identifier ID 218 is used as the key 226 in the delete table 220. The key 226 is generated using the identifier ID 218 and the first-generation seed, seed$_1$, represented as H(ID, seed$_1$). The value 228 represents the second hashed value for the identifier, H(ID, seed$_z$), which was generated using a different seed, seed$_z$, in order to identify the hash value as being deleted. The link to the entry corresponding to the identifier, ID, in the RMAP table 230 is broken since the hashed value based on the first-generation seed 236 cannot access the entry in the RMAP table.

FIG. 2C illustrates the state of the RMAP table 254 after another event is received from the user having previously issued a delete request. In this situation, there is an existing entry in the delete table 244 for the identifier 242. However, the entry contains a second hash value 252 that differs from the previous hash value 228 so that there is no way to access the previous entry in the RMAP table. The second hash value 252 is then used to generate another entry in the RMAP table for the identifier.

As shown in FIG. 2C, there is an event 240 having an identifier 242. The first-generation hash value for the identifier 250 is used to search the delete table 244. The corresponding entry is found in the delete table 244 using the first-generation hash value 250 as the key 246. The corresponding value 248 represents the second hash value 252 for the identifier. The second hash value 252 is used as the key 260 into the RMAP table 254. The RMAP table 254 includes a key 256 and value 258 pair for each entry. The key 256 is the second hash value 260 and the value 262 is the identifier.

FIG. 2D shows the state of the delete table 268 and the RMAP table 279 after a second delete request has been processed for a previously deleted personal identifier. A second hash value 276 is used to represent the personal identifier which is stored in the delete table 268 along with its first-generation hash value 274. The RMAP table 279 contains a key 280 and value 281 pair of data for each entry. Access to the entry in the RMAP table 279 is removed by associating the personal identifier with a different hash value that is generated using a different seed or salt. After a delete request is processed, a different seed is generated which is referred to as the current-generation seed. In this case, the current-generation seed, seed$_x$, is used to generate the hash value 276 that is placed in the value column 272. In this manner, there is no longer any access to the entry in the RMAP table 279 for the personal identifier 266.

As shown in FIG. 2D, the delete request 264 includes an identifier, ID 266. The delete table 268 contains a key 270 and a value 272 for each entry. The hashed value corresponding to the identifier ID 274 is used as the key 270 in the delete table 268. The key 274 is generated using the identifier ID 266 and the first-generation seed, seed$_1$, represented as H(ID, seed$_1$). The value 272 represents a second hashed value for the identifier, H(ID, seed$_x$), which was generated using a different seed, seed$_x$. The link to the entry corresponding to the identifier, ID, in the RMAP table 279 is broken since the hashed value cannot access the entry in the RMAP table 279.

Figure 2E:
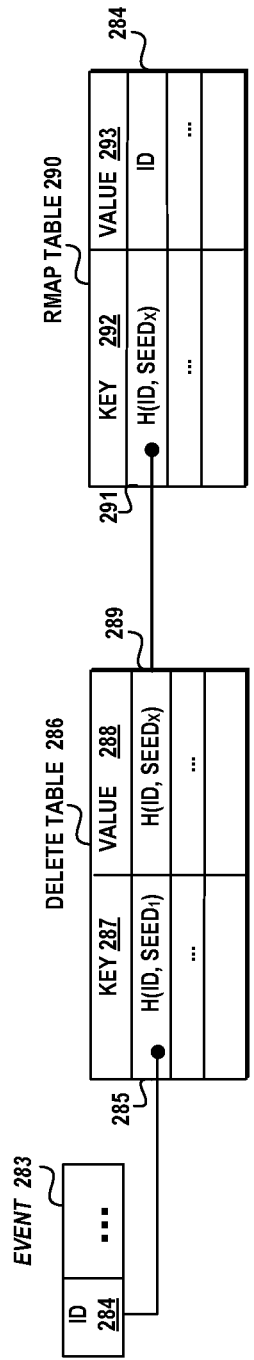

FIG. 2E illustrates the state of the RMAP table 290 after another event is received from a user having previously issued two delete requests for the same personal identifier. In this situation, there is an existing entry in the delete table 286 for the identifier 284. However, the entry contains a second hash value 288 that differs from the previous hash value 276 so that there is no way to access the previous entry in the RMAP table. The second hash value 289 is then used to generate another entry in the RMAP table 290 for the identifier.

As shown in FIG. 2E, an event 283 having an identifier 284 arrives at an ingest node. The first-generation hash value for the identifier 285 is used to search the delete table 286. The corresponding entry is found in the delete table 286 using the first-generation hash value 285 as the key 287. The corresponding value 288 represents a second hash value 289 for the identifier. The second hash value 289 is used as the key 292 into the RMAP table 290. The RMAP table 290 includes a key 292 and value 293 pair for each entry. The key 291 is the second hash value 289 and the value 293 is the identifier 284.

The various aspects of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an aspect is implemented using hardware elements and/or software elements may vary in accordance with any number of factors, such as desired computational rate, power levels, bandwidth, computing time, load balance, memory resources, data bus speeds and other design or performance constraints, as desired for a given implementation.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, other obfuscation techniques may be used instead of the hash encryption techniques described above such as randomization and the like.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
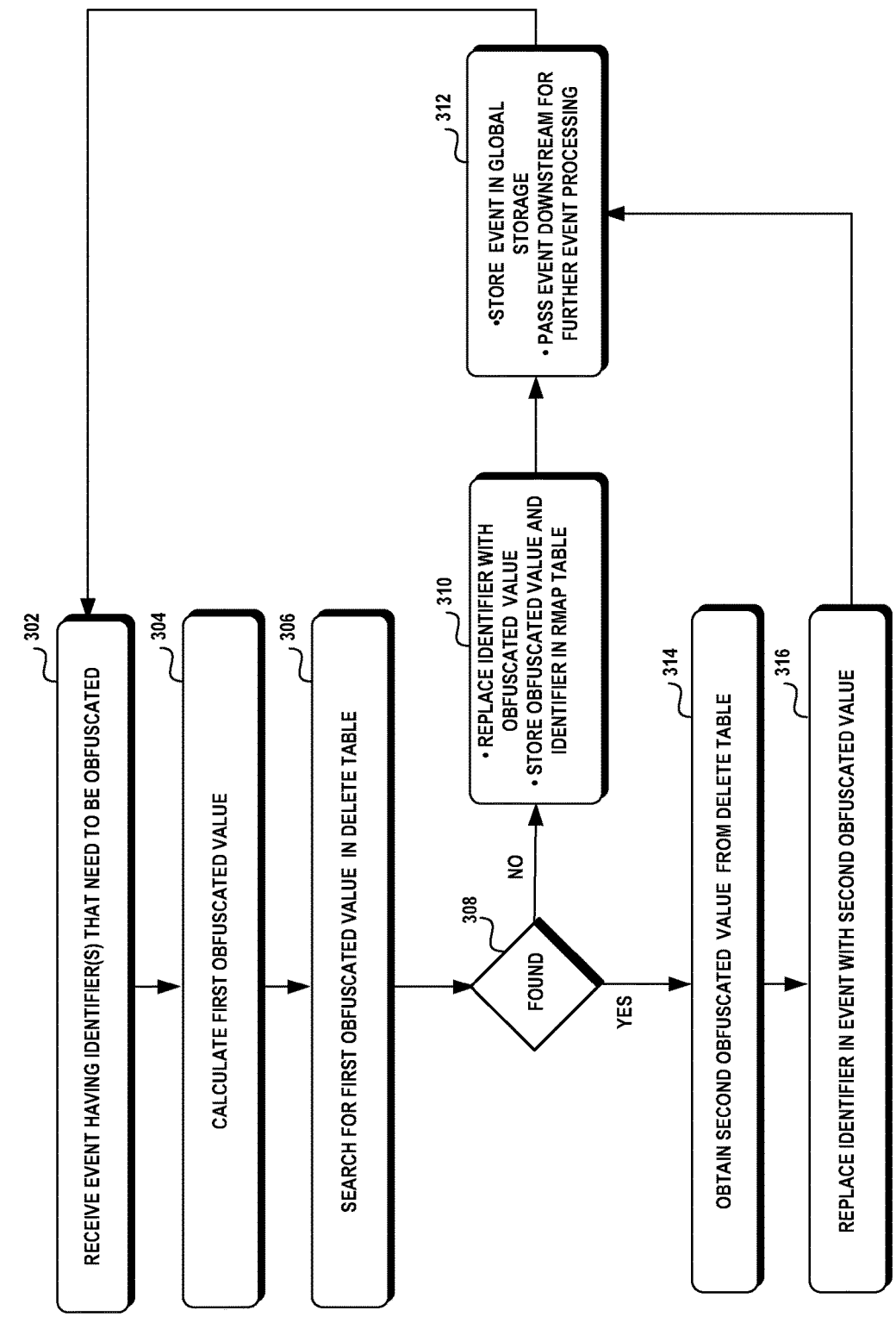
FIG. 3 a flow diagram illustrating an exemplary method for obfuscating personal identifiers in telemetric data.

FIG. 3 is a flow chart illustrating an exemplary method 300, performed by the ingest module in each domain, for obfuscating one or more personal identifiers received in an event. An ingest node in the event processing system receives numerous events having one or more personal identifiers that need to be obfuscated (block 302). In the case, where there are several personal identifiers that need to be obfuscated, one personal identifier is selected as the primary identifier. A first obfuscated value is computed for the primary identifier using an encryption hash function with a first-generation seed and the primary identifier (block 304). The first-generation hash value is then used as a key to search the delete table (block 306). If the first-generation hash value is found in the delete table (block 308—yes), then the primary identifier has been deleted previously. In this case, a second obfuscated value is obtained from the delete table (block 314) and used to replace the primary identifier in the event (block 316). The event is then stored in the global storage and passed onto other downstream components for additional processing (block 312).

If the first obfuscated value is not found in the delete table (block 308—no), then the first-generation hash value and the original personal identifier are stored in the RMAP table (block 310). The original value of the primary identifier in the event is replaced with the first-generation hash value (block 310). The event is then stored in the global storage and passed onto other downstream components for additional processing (block 312). The process is repeated for each event that is received by each ingest node (blocks 302-316).

Figure 4A:
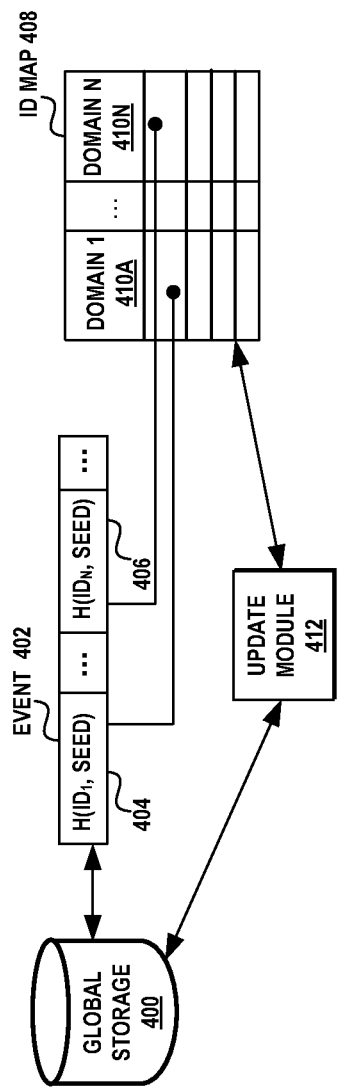
FIG. 4A illustrates the insertion of entries into the identifier ("ID") Map.
Figure 4B:
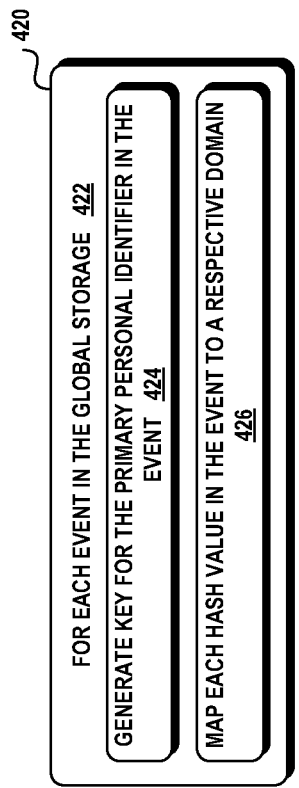
FIG. 4B is a flow diagram illustrating an exemplary method for inserting entries into the ID Map.

FIGS. 4A-4B illustrate the insertion of personal identifiers into the ID map. FIG. 4A is an exemplary block diagram showing the components used to insert personal identifiers in the ID map and FIG. 4B is an exemplary flow diagram illustrating the insertion process 420. Turning to FIGS. 4A-4B, the events received by the event processing system are stored in a global storage 400 accessible by each domain. An event 402 contains hashed values 404, 406 for each personal identifier in the event 402. The ID Map 408 contains a row for each event and a column for each domain 410A-410N ("410"). An update module 412 scans each event stored in the global storage 400 (block 422). An event has a primary identifier and may have additional dependent identifiers. The update module 412 inserts a row for the event using the hashed value of the primary identifier as the key (block 424). The update module 412 places each hashed value 404, 406 in the event 402 in a column that corresponds to the domain 410 from which the event is received.

Attention now turns to a discussion of the technique for updating the delete table and synchronizing each domain with an updated delete table. Turning to FIG. 5, in one aspect, an offline process is used to update the delete table to reflect the delete requests. A delete request contains at least one personal identifier which may associated with other dependent identifiers. In one aspect, the delete requests may be queued and processed offline at designated time intervals.

The offline process may use a copy of a current version of the delete table. The offline process will update the delete table (block 502), remove entries in the RMAP table that correspond to the personal identifiers associated with a delete request (block 504) and synchronized the update of each domain with the updated delete table (block 506).

Figure 6:
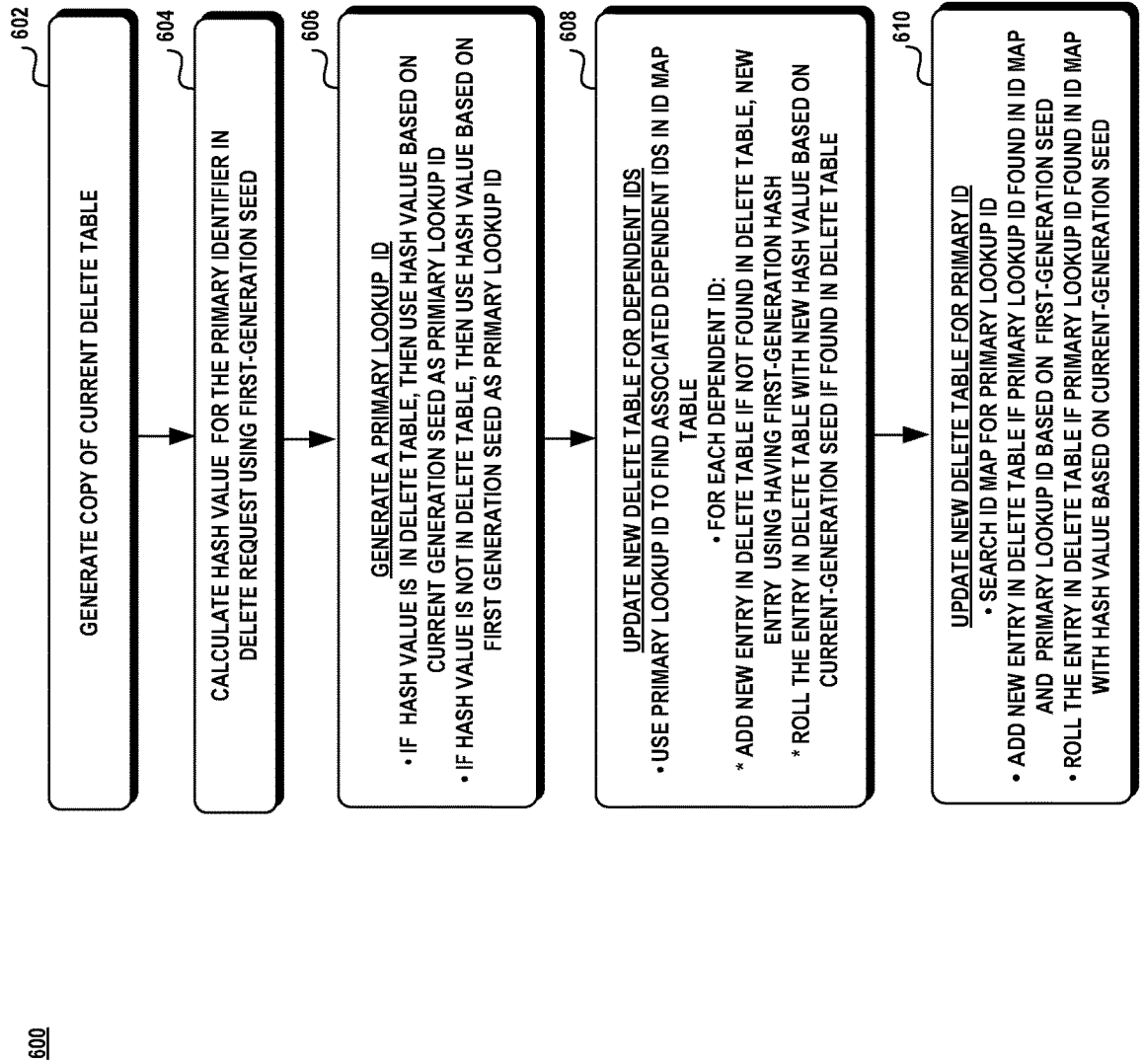
FIG. 6 is a flow diagram illustrating an exemplary method for generating a new version of the delete table.

Turning to FIG. 6, there is an exemplary method 600 of the process performed by the update module to process delete requests. The update module will generate a copy of the delete table and update its copy while the domains utilize the existing delete table (block 602). A hash value for the primary identifier in the delete request is generated using the current generation seed (block 604). This hash value is used to calculate a primary lookup identifier for the delete request (block 606). If the hash value is found in the key of the delete table, then the primary lookup identifier is set to a hash value based on the current-generation seed. Otherwise, the primary lookup identifier is set to a hash value based on the first-generation seed. In one aspect, the hash values may be of different sizes. For example, a hash value based on the first-generation seed may be 32 bytes in size and a hash value based on the current-generation seed may be 33 bytes in size. The update module may search the delete table looking for a stored hash value based on its size and determine from the size the generation of the hash value (collectively, 606).

The primary lookup identifier is then used to search the ID Map to find dependent identifiers (block 608). The primary lookup identifier is used as a key to the ID Map (block 608). If there is an entry in the ID Map based on the primary lookup identifier then the update module processes each entry in each domain column (block 608).

If the hash value in a domain column of the ID Map is not found in the key column of the delete table, then a new entry is added to the delete table for the hash value (block 608). The new entry in the delete table adds the hash value as the key and the value is a hash value computed using the current-generation seed (block 608). If the hash value in the domain column of the ID Map is found in the key column of the delete table, the hash value in the value column of the delete table is updated with a new hash value computed using a next-generation seed (block 608). This process is repeated for each entry in a domain column of the ID Map (block 608).

Next, the delete table is updated for the primary lookup identifier (block 610). A new entry in the delete table is added for the primary lookup identifier if the primary lookup identifier is found in the ID Map (block 610). The new entry in the delete table adds the primary lookup identifier in the key column and places a new hash value using a first-generation seed (block 610). An entry existing in the delete table matching the primary lookup identifier is updated with a new hash value using a next-generation seed is placed in the value column of the delete table (block 610).

Turning back to FIG. 5, after the delete table is updated, the entries in the RMAP table corresponding to the primary identifier in the delete request are deleted (block 504) and the delete table in each domain is replaced with the new version. In one aspect, the event processing system is temporarily suspended so that the RMAP tables in each domain are updated to delete entries matching the primary identifier in each delete request and to replace the delete table in each domain with the updated version of the delete table (block 506).

Exemplary Operating Environment

Figure 7:
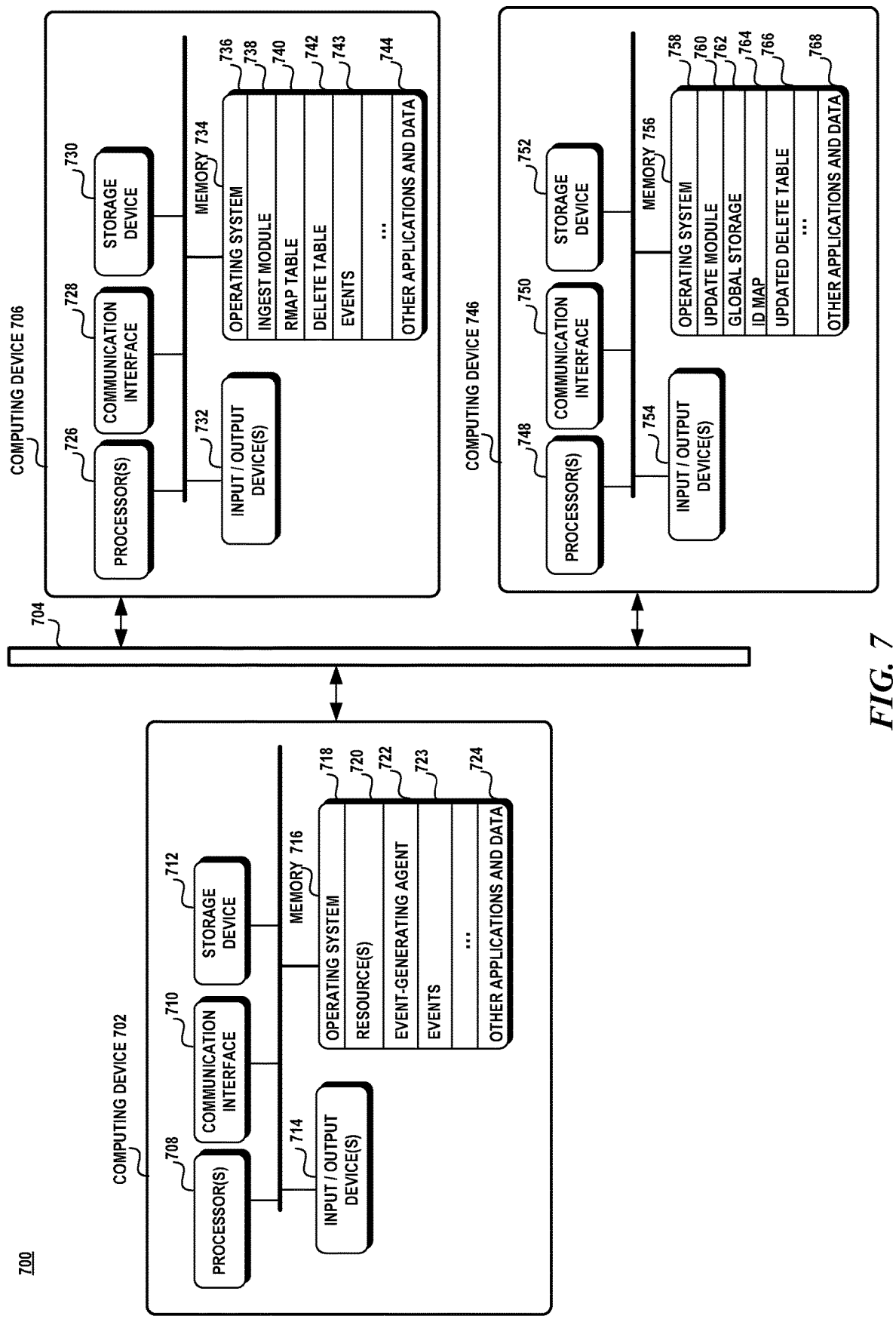
FIG. 7 is a block diagram illustrating an exemplary operating environment.

Attention now turns to a discussion of an exemplary operating embodiment. FIG. 7 illustrates an exemplary operating environment 700 that includes computing devices 702, 706, 746. The computing devices 702, 706, 746 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing devices 702, 706, 746 may include one or more processors 708, 726, 748, a communication interface 710, 728, 750, one or more storage devices 712, 730, 752, one or more input and output devices 714, 732, 754, and a memory 716, 734, 756. A processor 708, 726, 748 may be any commercially available or customized processor and may include dual microprocessors and multi-processor architectures. The communication interface 710, 728, 750 facilitates wired or wireless communications between a computing device 702, 706, 746 and other devices. A storage device 712, 730, 752 may be a computer-readable medium that does not contain propagating signals, such as modulated data signals transmitted through a carrier wave. Examples of a storage device 712, 730, 752 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 712, 730, 752 in a computing device 702, 706, 746. The input/output devices 714, 732, 754 may include a keyboard, mouse, pen, voice input device, touch input device, display, speakers, printers, etc., and any combination thereof.

The memory 716, 734, 756 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 716, 734, 756 may also include one or more external storage devices or remotely located storage devices that do not pertain to propagated signals, such as modulated data signals transmitted through a carrier wave.

In one aspect, computing device 702 is used by a user, computing device 706 is used by an ingest node, and computing device 746 is used by the offline process in the update domain. The memory 716, 734, 756 may contain instructions, components, and data. A component is a software program that performs a specific function and is otherwise known as a module, program, engine, and/or application. The memory 716 of computing device 702 may contain an operating system 718, one or more resources 720, such as one or more software products, an event-generating agent 722 communicatively coupled to a resource that produces events 723, and other applications and data 724. The memory 734 of computing device 706 may contain an operating system 736, an ingest module 738, an RMAP table 740, a delete table 742, events 743 and other applications and data 744. The memory 756 of computing device 746 may contain an operating system 758, an update module 760, a global storage 762, an ID Map 764, updated delete table 766, and other applications and data 768.

CONCLUSION

Aspects of the subject matter disclosed herein pertain to the technical problem of obfuscating and deleting personal identifiers contained in a large volume of events where the events contain telemetric data and are processed in a loosely-coupled distributed system. The technical features associated with addressing this problem uses a technique of obfuscated values that replace the personal identifiers so that the telemetric data may be used without reference to the personal identifiers. The obfuscated values are constructed so that they can distinguish between a personal identifier that has been subject to a delete request and a personal identifier that has not been subject to a delete request.

A system is disclosed that comprises at least one domain, wherein the at least one domain includes one or more processors and a memory. The at least one domain performs actions that: maintain a reversible map that maps an obfuscated value to at least one personal identifier; maintain a delete table, the delete table including a plurality of entries for deleted personal identifiers, an entry including a first obfuscated value and a second obfuscated value, the first obfuscated value associated with a first-generation randomized value, the second obfuscated value based on a current-generation randomized value; obtain at least one event including the at least one personal identifier; replace the at least one personal identifier with the first obfuscated value in the at least one event when the at least one personal identifier is not contained in the delete table; replace the at least one personal identifier with the second obfuscated value in the at least one event when the at least one personal identifier is contained in the delete table; and utilize the event data without reference to the at least one personal identifier.

Access to the reversible map is based on the first obfuscated value when the at least one personal identifier is not found in the delete table. Access to the reversible map is based on the second obfuscated value when the at least one personal identifier is found in the delete table. The at least one domain performs further actions that: upon receipt of a delete request for the at least one personal identifier, search for the first obfuscated value associated with the at least one personal identifier in the delete table; and when the first obfuscated value exists in the delete table, delink access to the reversible map by altering the second obfuscated value in the delete table associated with the at least one personal identifier. The at least one domain performs further actions that: when the first obfuscated value does not exist in the delete table, generate an entry in the delete table for the at least one personal identifier, the entry including the first obfuscated value and a second obfuscated value, the second obfuscated value associated with a next-generation randomized value.

The system includes an update domain having at least one processor and a memory. There is at least one module in the update domain configured to performs actions that: generate an identifier table to store dependent personal identifiers associated with the at least one personal identifier in the at least one event; and construct an updated delete table to reflect personal identifiers received in events from any domain having been subject to a delete request.

The at least one module in the update domain performs further actions that: create entries in the updated delete table for a personal identifier subject to a delete request that does not exist in the delete table; and update an obfuscated value associated with a personal identifier existing in the delete table. Further actions include the removal of entries in the reversible map for a personal identifier subject to a delete request and updating the current-generation randomized value. The size of the first obfuscated value differentiates the first obfuscated value from the second obfuscated value.

A method is disclosed comprising the actions of: obtaining a first delete request at an ingest node of a computing system to remove at least one personal identifier, the ingest node including at least one processor and a memory, the ingest node storing the at least one personal identifier in a first table, the at least one personal identifier in the first table accessed by a current obfuscated value; searching for the at least one personal identifier in a delete table using a first obfuscated value, the first obfuscated value based on the at least one personal identifier, the delete table accessed by the first obfuscated value, the delete table storing a second obfuscated value, the first obfuscated value different from the second obfuscated value; inserting an entry for the at least one personal identifier in the delete table when the first obfuscated value is not found in the delete table; delinking access to the at least one personal identifier in the first table by replacing the second obfuscated value in the delete table with an obfuscated value that differs from the current obfuscated value when the at least one personal identifier is found in the delete table; and utilizing telemetric data associated with the at least one personal identifier without reference to the at least one personal identifier.

Searching for the at least one personal identifier in a delete table further comprises generating the first obfuscated value using the at least one personal identifier and a first randomized value. The method performs further actions of obtaining an event including the at least one personal identifier; and when the at least one personal identifier has a corresponding entry in the delete table, storing the at least one personal identifier in the first table using the second obfuscated value from the delete table. The method further comprises: obtaining a second delete request for the at least one personal identifier; and delinking access to the at least one personal identifier in the first table by replacing the second obfuscated value in the delete table with an obfuscated value that differs from the second obfuscated value.

The method further comprises: obtaining an event associated with a first personal identifier; determining that the first personal identifier is not associated with an entry in the delete table; storing an obfuscated value representing the first personal identifier in the first table; replacing the first personal identifier with the obfuscated value in the event; and utilizing data in the event without reference to the first personal identifier.

A device is disclosed having at least one processor and a memory. The at least one processor is configured to: generate a first mapping that maps a current obfuscation value to a personal identifier; generate a second mapping that maps a first obfuscation value to the current obfuscation value; obtain first event data including the personal identifier; replace the personal identifier in the event data with the first obfuscation value, when the first obfuscation value does not map to the current obfuscation value; replace the personal identifier in the event data with the current obfuscation value, when the first obfuscation value maps to the current obfuscation value; and retain the first event data without the personal identifier.

The first obfuscated value is based on the personal identifier and a first randomized value and the second obfuscated value is based on the personal identifier and a second randomized value, the first randomized value differs from the second randomized value. The device is further configured to: delink access to the first mapping of the personal identifier by altering the second obfuscation value; and generate a mapping from a subsequent-generation obfuscated value to the personal identifier upon receipt of a second event data including the personal identifier. The current obfuscation value and the first obfuscation value are generated using a different randomized value. The event data includes telemetric data.

Although the subject matter has been described in language specific to structural features and/or methodological acts, it is to be understood that the subject matter defined in the appended claims are not necessarily limited to the specific features or acts described above. Rather, the specific features and acts described above are disclosed as example forms of implementing the claims.

What is claimed:

1. A system comprising:
at least one domain, wherein the at least one domain includes one or more processors and a memory;
wherein the at least one domain includes at least one module that performs actions that:
obtain an event including a personal identifier;
generate an obfuscated value to replace the personal identifier;
search for the obfuscated value in a delete table, wherein the delete table includes a plurality of entries, an entry including a first obfuscated value and a second obfuscated value, the first obfuscated value associated with a first-generation randomized value, the second obfuscated value based on a current-generation randomized value;
when the obfuscated value is not found in the delete table, replace the personal identifier in the event with the obfuscated value and store in a reversible map table;
when the obfuscated value is found in the delete table, obtain the second obfuscated value of the personal identifier from the delete table and replace the personal identifier in the event with the second obfuscated value; and
utilize the event without reference to the personal identifier.

2. The system of claim 1, wherein the at least one module performs actions that:
receive a delete request for the personal identifier;
generate the obfuscated value of the personal identifier;
search for the obfuscated value in the delete table; and
when the obfuscated value exists in the delete table:
generate a new obfuscated value; and
store the new obfuscated value as the second obfuscated value in the delete table in an entry associated with the personal identifier, wherein the new obfuscated value delinks access to the reversible map table for the personal identifier.

3. The system of claim 2, wherein the at least one module performs further actions that:
when the obfuscated value does not exist in the delete table, generate an entry in the delete table for the personal identifier, the entry including the obfuscated value as the first obfuscated value.

4. The system of claim 2, wherein a size of the obfuscated value differentiates the obfuscated value from the second obfuscated value.

5. The system of claim 1, further comprising:
an update domain including at least one processor and a memory;
at least one module in the update domain configured to performs actions that:
generate an identifier table to store dependent personal identifiers associated with the personal identifier in the event; and
construct an updated delete table to reflect personal identifiers received in events from any domain having been subject to a delete request.

6. The system of claim 5, wherein the at least one module in the update domain performs further actions that:
create entries in the updated delete table for a personal identifier subject to a delete request that does not exist in the delete table; and
update an obfuscated value associated with a personal identifier existing in the delete table.

7. The system of claim 6, wherein the at least one module in the update domain performs further actions that remove entries in the reversible map for a personal identifier subject to a delete request.

8. The system of claim 7, wherein the at least one module in the update domain performs further actions that update the current-generation randomized value.

9. A method, comprising:
obtaining a first delete request at an ingest node of a computing system to remove a personal identifier, the ingest node including at least one processor and a memory, the personal identifier stored in a reversible map table of the ingest node, the personal identifier accessed in the reversible map table by an obfuscated value;
generating the obfuscated value to replace the personal identifier;
searching for the personal identifier in a delete table using the obfuscated value, wherein the delete table includes a plurality of entries, an entry including a first obfuscated value and a second obfuscated value, the first obfuscated value associated with a first-generation randomized value, the second obfuscated value based on a current-generation randomized value;
when the personal identifier is not found in the delete table, inserting an entry in the delete table for the personal identifier, the entry containing the obfuscated value;
when the personal identifier is found in the delete table, delinking access to the personal identifier in the reversible map table by replacing the second obfuscated value in the delete table with a new obfuscated value; and
utilizing telemetric data associated with the personal identifier without reference to the personal identifier.

10. The method of claim 9, wherein searching for the at least one personal identifier in a delete table further comprises generating the obfuscated value using the personal identifier and a first randomized value.

11. The method of claim 9, further comprising:
obtaining an event including the personal identifier;
searching for the personal identifiers in the delete table;
when the personal identifier has a corresponding entry in the delete table, storing the personal identifier in the reversible map table using the second obfuscated value from the delete table.

12. The method of claim 11, further comprising:
obtaining a second delete request for the personal identifier; and
delinking access to the personal identifier in the reversible map table by replacing the second obfuscated value in the delete table with a new obfuscated value.

13. The method of claim 9, further comprising:
obtaining an event associated with a first personal identifier;
determining that the first personal identifier is not associated with an entry in the delete table;

generating an obfuscated value for the first personal identifier;

storing the obfuscated value for the first personal identifier in the reversible map table;

replacing the first personal identifier with the obfuscated value for the first personal identifier in the event; and utilizing data in the event without reference to the first personal identifier.

14. A device, comprising:

at least one processor and a memory;

wherein the at least one processor is configured to:
  generate a delete table having a plurality of entries, an entry maps a first obfuscation value to a second obfuscation value;
  generate a reversible map table having a plurality of entries, an entry maps the first obfuscation value to a personal identifier;
  obtain event data including the personal identifier;
  generate the first obfuscation value to replace the personal identifier;
  replace the personal identifier in the event data with the first obfuscation value, when the first obfuscation value is not found in the delete table;
  replace the personal identifier in the event data with the second obfuscation value, when the first obfuscation value is found in the delete table; and
  retain the event data without the personal identifier.

15. The device of claim 14, wherein the first obfuscated value is based on the personal identifier and a first randomized value and the second obfuscated value is based on the personal identifier and a second randomized value, the first randomized value differs from the second randomized value.

16. The device of claim 14, wherein the at least one processor is further configured to:
  receive a first delete request for the personal identifier;
  delink access to the reversible map table entry of the personal identifier by altering the second obfuscation value in the delete table.

17. The device of claim 16, wherein the at least one processor is further configured to:
  receive a second event including the personal identifier; and
  generate an entry in the reversible map table for the personal identifier using the second obfuscated value from the delete table for the personal identifier.

18. The device of claim 17, wherein the at least one processor is further configured to:
  receive a second delete request for the personal identifier;
  generate a new obfuscation value for the personal identifier; and
  delink access to the reversible map table entry of the personal identifier by storing the new obfuscation value as the second obfuscation value in the delete table.

19. The device of claim 14, wherein the event data includes telemetric data.

* * * * *